No. 688,872.  
T. MEYER.  
METHOD OF MAKING SULFURIC ACID.  
(Application filed Feb. 16, 1901.)  
Patented Dec. 17, 1901.
(No Model.)
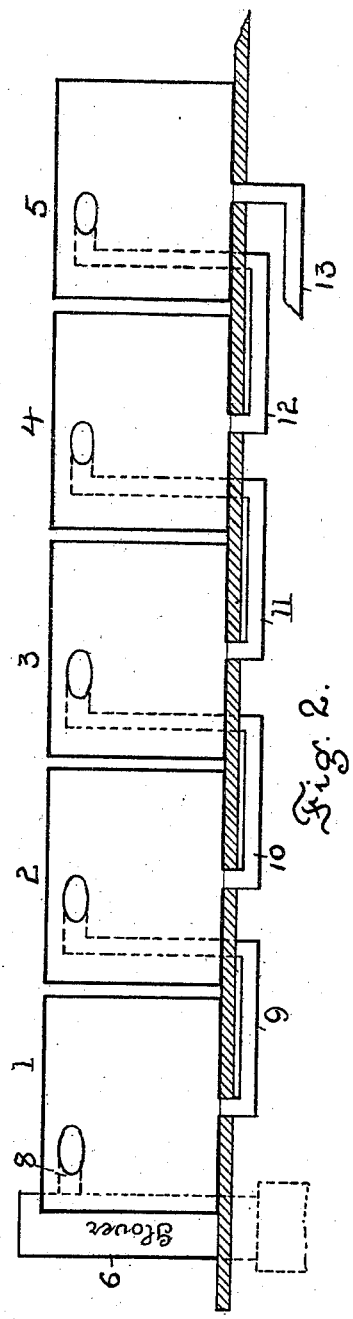
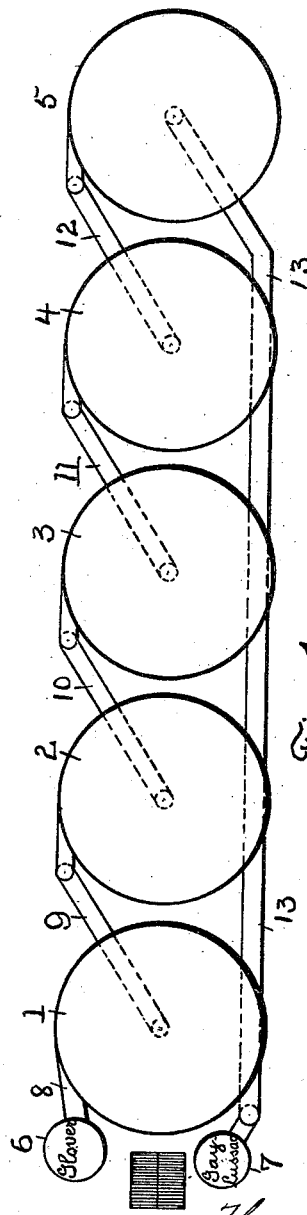

UNITED STATES PATENT OFFICE.

THEODORE MEYER, OF OFFENBACH, GERMANY, ASSIGNOR OF ONE-HALF TO CHARLES GLASER, OF BALTIMORE, MARYLAND.

METHOD OF MAKING SULFURIC ACID.

SPECIFICATION forming part of Letters Patent No. 688,872, dated December 17, 1901.

Application filed February 16, 1901. Serial No. 47,609. (No specimens.)

*To all whom it may concern:*

Be it known that I, THEODORE MEYER, a subject of the Emperor of Germany, and a resident of Offenbach, Germany, have invented certain new and useful Improvements in the Method of Making Sulfuric Acid, of which the following is a specification.

In the condensing-chambers usually employed in the manufacture of sulfuric acid, in which the gas from which the acid is to be made is forced to pass through said chambers by the shortest path, the movement of the vapors through the chambers is in great measure rectilinear and but slightly modified by the cooling action of the walls. The reactions of the gases upon one another by which acid is formed takes place principally when the gases are brought into intimate association with one another, and in the old form of chambers the reaction took place principally at the inlets and outlets of the chambers which were not provided with obstructions, and in chambers which were provided with obstructions the reactions took place largely at the points of obstruction. The first of these forms was costly and slow of operation, besides which it concentrated the high temperature produced by the chemical reaction at circumscribed and objectionable points. In the latter class of apparatus the apparatus was expensive, and they were not, as a rule, provided with any means for reducing the temperature of the gases.

This invention relates to a novel method of treating the gases of which sulfuric acid is made so as to produce a high yield of acid in a simple and comparatively cheap apparatus.

The method consists in imparting to the gases in the acid-chamber a spiral volute motion by introducing them tangentially into the chamber and withdrawing them at a point which will be in the center of their path of motion in the chamber. When the gases are introduced tangentially into a suitable chamber, they will travel around and around in contact with the walls of the chamber, and thus describe a very elongated path—that is to say, they will go around many times and will during their travel become intimately mixed, and active chemical action will result with an increase of temperature. If the external temperature be low enough, (and it may be made anything desired by artificial means,) the gases as they come into contact with the walls of the chamber will be cooled and will become denser. There will be a difference of temperature therefore between gases in the chamber, and the denser ones will gather at the center of the chamber, being drawn into the vortex at that point, and being denser than the surrounding gases may be drawn off from the center of the bottom of the chamber. If the external temperature be such as not to cool the gases sufficiently, they will tend to rise to the top of the chamber, and hence must be drawn off at the top, in which case the gas-inlets must be at the bottom.

I carry my method into operation by an apparatus which is herein described and for which an application for patent is pending currently with this one, Serial No. 47,608, filed February 16, 1901, in which the gases are introduced at the top and drawn off from the bottom of each chamber; but it will be understood that my invention may be utilized in many other forms of apparatus and particularly by reversing the location of the inlet and outlet pipes.

In the accompanying drawings my invention is diagrammatically illustrated.

Figure 1 shows an elevation of a plurality of chambers connected together by pipes. Fig. 2 shows a plan of the same.

Referring to the drawings, 1, 2, 3, 4, and 5 are a series of circular acid-chambers, 6 is a Glover tower, and 7 a Gay-Lussac tower. The Glover tower is connected with the chamber 1 by a pipe 8, which enters chamber 1 at the side near the top and tangentially. 9 is an exit-pipe connected to the chamber 1 at the center of its bottom and to the chamber 2 at its side near the top and tangentially in manner similar to pipe 8 and chamber 1. Pipe 10 leaves chamber 2 at the center of its bottom and enters the top of chamber 3 at the top of its side tangentially. Pipe 11 leaves chamber 3 and enters 4 in the same manner. Pipe 12 leaves chamber 4 and enters chamber 5 in the same manner, and pipe 13 leaves the center of the bottom of chamber 5 and enters the Gay-Lussac tower. Any number of chambers may be used which experience dictates.

The operation is as follows: When the gases enter chamber 1 by pipe 8 from the Glover tower, they travel in a helical path around and around the chamber in contact with the walls, and the circle of their travel gradually grows less and less as they describe a volute curve in the chamber until they reach the center, where the gases which have been longest in the chamber, being the coolest and most dense, will sink and escape by the pipe 9 from the center of the bottom. This action would not take place but for the cooling action of the walls of the chamber. As the gases travel around and around in the chamber chemical union will take place with a considerable increase in temperature, and unless the gases were cooled they would not only have to be drawn off from the top of the chamber, but the extremely high temperature would interfere with the economical production of acid; but the repeated contact of the gases with the cooling walls of the chamber as they travel around and around in contact with them will so reduce the temperature as to accelerate the production of acid and reduce the temperature of the gases, so that they will fall in the center of the chamber and escape from the bottom and not from the top. The path of travel of the gases as they progress around and around the chamber will be so long that a very intimate mixture of them will result and a high production of acid, hence a low cost in chambers, which may be made smaller per unit of capacity.

Having now described my invention, what I claim, and desire to secure by Letters Patent, is—

The method of making sulfuric acid which consists in imparting to the gases of which the sulfuric acid is made, a circular, spiral volute motion within a chamber, the gases being introduced at the top, and withdrawn from the bottom of the chamber, whereby the gases are intimately mixed, active chemical action is caused, and they are cooled by contact with the external walls of the chamber during an extended path of travel.

Signed by me at Frankfort-on-the-Main, Germany, this 16th day of January, 1901.

THEODORE MEYER.

Witnesses:
JEAN GRUND,
CARL GRUND.